Dec. 29, 1925.  
H. S. BECKER  
1,567,227  
HEADLIGHT FOR TOY ELECTRIC LOCOMOTIVES  
Filed Feb. 16, 1925
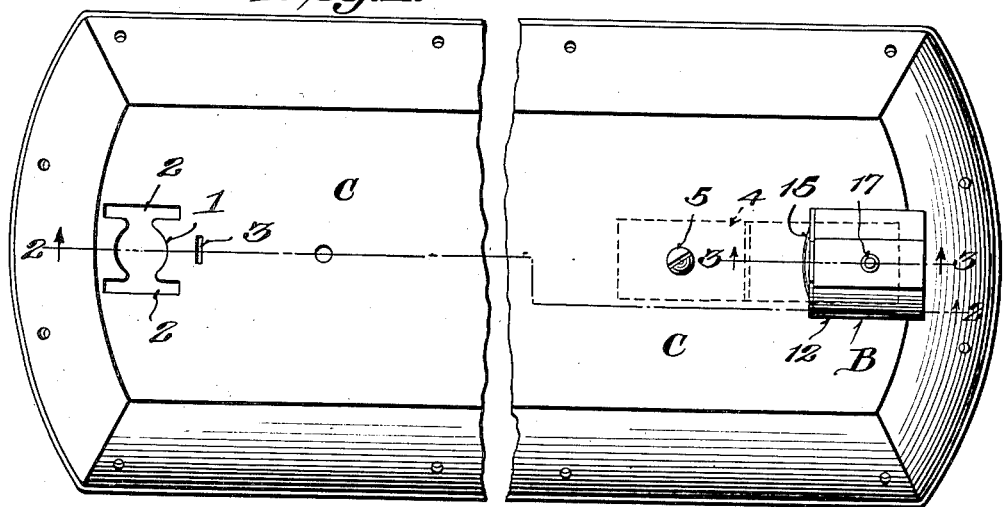
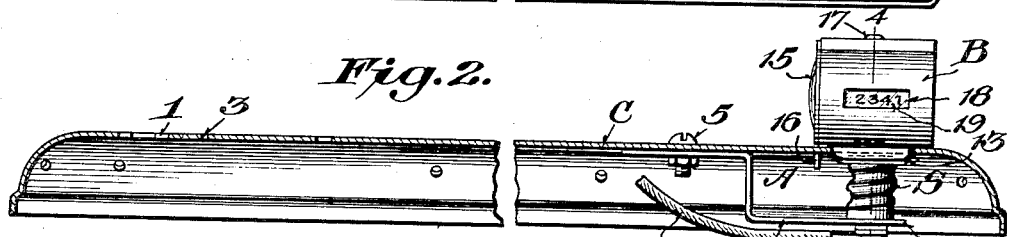
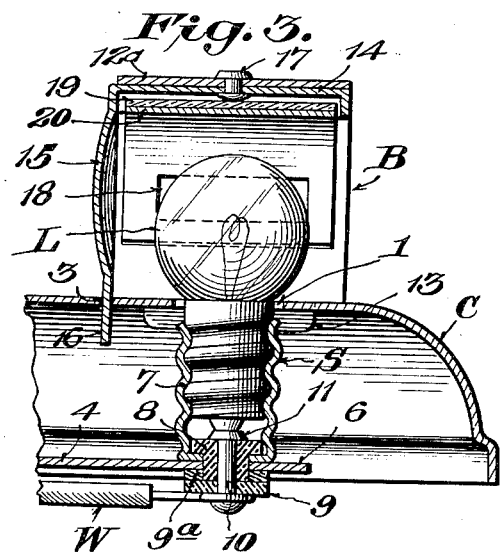
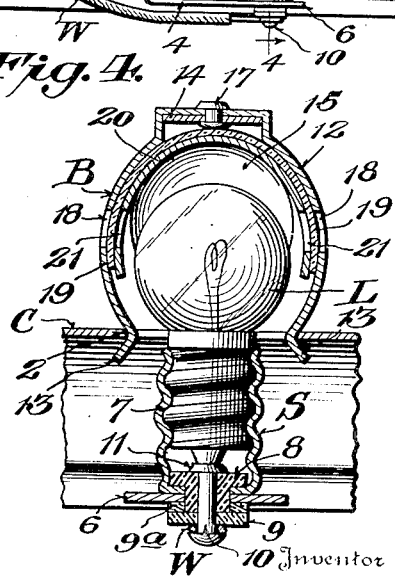
WITNESSES:—
Inventor  
*Harry S. Becker,*  
By  
Attorney Patented Dec. 29, 1925.

1,567,227

UNITED STATES PATENT OFFICE.

HARRY S. BECKER, OF CHICAGO, ILLINOIS, ASSIGNOR TO AMERICAN FLYER MANUFACTURING COMPANY, OF CHICAGO, ILLINOIS, A CORPORATION OF ILLINOIS.

HEADLIGHT FOR TOY ELECTRIC LOCOMOTIVES.

Application filed February 16, 1925. Serial No. 9,668.

*To all whom it may concern:*

Be it known that I, HARRY S. BECKER, a citizen of the United States, residing at Chicago, in the county of Cook and State of Illinois, have invented certain new and useful Improvements in Headlights for Toy Electric Locomotives, of which the following is a specification.

This invention relates to toy electric railways and more particularly to a novel headlight construction for toy locomotives.

In toy train design it is desirable to follow the general appearance and general arrangement of modern electric locomotives of the type used on traction lines and railways, and to that end it is proposed to provide a headlight construction having the appearance of headlights usually found on standard equipment, and yet possessing novel structural features peculiar to conditions and problems involved in toy car construction.

Accordingly, the present invention has primarily in view the provision of a headlight construction wherein the housing or lamp box may be readily attached to and detached from the roof of the cab of the locomotive or car, without the use of special tools, thereby facilitating the replacement of the electric lamp whenever necessary. Thus, it is one of the objects of the present invention to provide, in combination with the cab or car roof, a lamp socket positioned beneath the roof and a readily detachable lamp box supported on the roof over the lamp position.

A further object of the invention is to provide a lamp box construction which completely houses and protects the lamp from acccidental injury, thereby increasing the factor of safety with respect to the headlight installation. In that connection it is desired to also arrange the headlight in such a position within the hood that the lamp will not project beyond the front of the headlight hood or casing thus centralizing the lamp and serving to more conspicuously illuminate windows or openings in the sides of the headlight housing through which may be seen either a colored screen or a number painted on a transparent medium fitted and held within the lamp box proper.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which Fig. 1 is a top plan view of a cab or car roof showing the location and arrangement of the headlight construction.

Fig. 2 is a longitudinal sectional view taken on the line 2—2 of Figure 1.

Fig. 3 is a vertical longitudinal sectional view taken on the line 3—3 of Fig. 1.

Figure 4 is a vertical cross sectional view taken on the line 4—4 of Fig. 2.

Similar reference characters designate corresponding parts throughout the several figures of the drawings.

According to the form of the invention shown in the drawings it is proposed to provide a lamp support designated generally as A and a lamp-box unit B detachably fitted to the cab or car roof C, the purpose of such arrangement being primarily to permit of ready access to the lamp support, while at the same time affording concealment and protection to the lamp to simulate as closely as possible the appearance of headlights on modern locomotives or cars.

Referring to Figure 1 it will be observed that the cab roof C is provided with a circular opening 1 having at opposite sides thereof the parallel slots 2 which may communicate with the opening 1 as shown. At the rear of the opening 1 there is also preferably provided a transverse slot 3 which assists in holding the reflector of the lamp-box as will presently appear.

Beneath the opening 1 there is arranged a lamp socket S, the same forming a part of a lamp support A which includes the angular bracket 4 adapted to be secured as indicated at 5 to the cab roof and supporting the said socket S at the end 6 thereof. The said socket S comprises the screw shell contact 7 which is secured to the bracket 4 by the washer elements 8 and 9, the former including a sleeve-like portion which passes through an opening in the portion 6 of the bracket 4 as clearly shown in Figures 3 and 4. For the purpose of holding the washers 8 and 9 and the intervening filler washer 9ª together, thereby to secure the screw shell contact 7 in place, a rivet or other fastening 10 is utilized, the same constituting a terminal for the feed wire W of the lamp circuit and furthermore constituting the center-plug contact 11 of the lamp socket. As will be clear from the drawings the said socket S is readily accessible through the opening in the roof C whereby the lamp L may be readily fitted in position.

The lamp-box unit B preferably comprises a hood member 12 which is of substantially U-shaped formation and of sufficient width to project reasonably beyond the diameter of the lamp L thereby to fully conceal the same when in position. The said hood member 12 is preferably made of resilient metal and the sides or leg portions thereof are provided with the offset holding feet 13 adapted to fit in the slots 2 thereby to hold the hood in position. The upper or central part of the hood is offset as shown at 12ª thereby to provide a recess which may receive the arm 14 of a reflector member 15. This reflector member is provided with a depending tongue 16 for entering the slot 3 in the car roof and serves to close the rear end of the hood thereby to throw the light rays from the lamp forward. The offset portion 12ª in addition to providing a seat for the arm 14 which may be fastened thereto by means of the rivet 17 or its equivalent also further serves to simulate the ventilator of a standard lamp box.

The side walls of the hood 12 may also be provided with windows 18 which may be covered on the inside with a transparent medium 19 which in turn may be held in position by springing the resilient clip 20 in place, the said clip being provided with openings 21 for registering with the openings 18 in the hood 12. The transparent medium 19 may be red, green or other colored celuloid, or may be plain celluloid with numbers or letters stenciled thereon to cause the same to appear through the window openings 18.

With the foregoing arrangement and construction it will be apparent that the entire lamp box B may be readily and quickly removed as a unit from the top of the cab or car by simply compressing the sides of the hood 12 so that the feet 13 thereof will disengage the slots 2. The reflector member as well as the transparent medium inside of the hood are all carried therewith by reason of the construction described so that when the lamp box is removed to replace or adjust the lamp L, none of the parts will separate thereby greatly facilitating the manipulation of the lamp box for that purpose.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A headlight construction for toy locomotives including the combination with the cab roof, of a lamp support arranged beneath the cab roof and including a socket arranged beneath an opening in the roof, and a lamp box detachably fitted to the roof over the opening whereby its removal will permit access to said socket, said lamp box comprising a hood having means for detachably interlocking with the cab roof at each side of the opening therein, and a reflector member carried by said hood thereby to be removable therewith as a unit from the cab roof.

2. A headlight construction for toy locomotives including in combination with the cab roof having an opening, a lamp socket arranged beneath said opening, and a lamp box detachably engaging with the cab roof adjacent said opening and comprising a hood member having relatively compressible side portions adapted to engage with the opening in the roof, a reflector member carried by the hood and adapted to be arranged in the rear of a lamp fitted in said socket.

3. A headlight construction for toy locomotives including in combination with the cab roof having a circular opening and parallel slots communicating therewith, a lamp socket arranged beneath the circular portion of the opening, and a substantially inverted U-shaped hood having resilient leg portions adapted to engage with said slots at the opposite sides of said opening.

4. A headlight construction for toy locomotives including in combination with the cab roof having an opening, a lamp socket beneath the opening and a lamp box unit fitted to the car roof above the opening, said lamp box unit being open at the front end to emit the light of a lamp in the socket and having openings in the side walls, a transparent medium adapted to cover the inside portion of said openings, and a resilient clip for holding said transparent medium in position.

5. A headlight construction for toy locomotives including a lamp box adapted to be carried by the roof of the locomotive and comprising a hood member constituting the sides of the lamp box and provided at the top thereof with an offset portion, a reflector member including an arm adapted to fit in said offset portion of the hood member, and means for fastening said arm to the hood.

6. A headlight construction for toy locomotives comprising, in combination, a cab roof having a lamp access opening, a lamp socket supported beneath said opening and adapted to receive the plug of a lamp inserted through the opening, and a lamp box comprising a body including a substantially inverted U-shaped hood detachably fitted to the roof over said opening.

7. A headlight construction for toy locomotives including the combination with the cab roof having an opening, of a lamp support carried by the inside of the roof and underlying said opening, and a socket including center-plug and screw-shell contacts carried by the part of said support located beneath the opening thereby to receive the plug of a lamp, and a lamp box including a hood detachably fitted to the roof over the opening.

8. A headlight construction for toy locomotives including in combination with the cab roof having an opening, an angular bracket carried by the under side of the cab roof and having one end located beneath said opening, a lamp socket carried by the bracket, an insulating center-plug contact carried by the bracket and constituting a line-wire terminal, and a lamp box fitted to the cab roof over the opening therein.

9. A headlight construction for toy locomotives comprising the combination with the cab roof having an opening, of a support including electrical lamp terminals arranged beneath said opening and adapted to receive the plug of a lamp, and a hood simulating a headlight casing of standard locomotives detachably engaging the cab roof adjacent the opening.

10. A headlight construction for toy locomotives comprising the combination with the cab roof having an opening, of a support beneath said opening including lamp terminals one of which is adapted to receive the screw plug of a lamp inserted through the opening while the bulb of the lamp is projected above the cab roof, and a hood comprising a body of substantially U-shaped formation and having a reflector at one end thereof and open at the other end, and the sides of said body being compressible and adapted to detachably engage with the car roof at opposite sides of the opening.

In testimony whereof I hereunto affix my signature.

HARRY S. BECKER.